United States Patent

Kafitz

[15] 3,697,995

[45] Oct. 10, 1972

[54] INCREASED POWER ELECTRONICALLY SCANNING INTEGRATED ANTENNA SYSTEM

[72] Inventor: Peter H. Kafitz, La Jolla, Calif.

[73] Assignee: The Ryan Aeronautical Co., San Diego, Calif.

[22] Filed: Nov. 20, 1967

[21] Appl. No.: 684,263

[52] U.S. Cl. ................. 343/100 SA, 331/53, 331/55
[51] Int. Cl. ..................... H01g 3/26, H03b 19/00
[58] Field of Search ............... 343/100.6; 331/53, 55

[56] References Cited

UNITED STATES PATENTS

| | | |
|---|---|---|
| 2,842,667 | 7/1958 | Dench et al. ............. 331/55 |
| 3,003,118 | 10/1961 | Kline ..................... 331/55 |
| 3,238,528 | 3/1966 | Hines ................... 343/100.6 |
| 3,345,631 | 10/1967 | Chamberlin ........... 343/100.6 |
| 3,427,620 | 2/1969 | Aasted et al. .......... 343/100.6 |

Primary Examiner—T. H. Tubbesing
Attorney—Carl R. Brown

[57] ABSTRACT

This invention concerns an electronically scanning integrated antenna system that has free running oscillators for providing large power output to each antenna and utilizes frequency multipliers, preferably step recovery diode multipliers, for controlling the frequency and phase of the free running oscillators outputs independently of the means for providing modulated intelligence to the radiated beam.

2 Claims, 8 Drawing Figures

INVENTOR.
PETER H. KAFITZ
BY
*Carl R. Brown*
ATTORNEY

INCREASED POWER ELECTRONICALLY SCANNING INTEGRATED ANTENNA SYSTEM

BACKGROUND OF THE INVENTION

In transmitting antenna arrays, to steer or tilt the transmitted beam, the outputs of the individual antennas are varied in phase individually. If the phase distribution varies linearly across the array, then the radiated beam will scan. In known systems, the power is normally generated by a single oscillator. The oscillator output is amplified and, if necessary, multiplied to obtain the proper radio frequency power at the desired frequency. The output of the single oscillator is split into several outputs, one for each antenna element. The phase of the signal to each element is controlled by individual phase shifters that can be variable delay lines, circuit elements that are switched in or out by diodes, or ferrite phase shifters. Whatever the system used to shift the phase of the radiated beam, the systems are cumbersome, have poor reliability, require large amounts of power for beam steering and in general have a low over-all efficiency. Further in such known systems where it is necessary to modulate the beam, the radio frequency signal is both modulated and phase shifted through the same phase shifter and frequency multiplier circuits. This complicates the circuitry and requires that compromises be made in designing the circuitry. So poor reliability, large and complicated circuits, and low efficiency are some of the primary reasons why scannable transmitting antenna arrays have not been used in many applications, such as on spacecraft.

SUMMARY OF THE INVENTION

This invention generally comprises a scannable transmitting antenna and antenna array in which the direction of the radiated beam is controlled electronically by selectively varying the phase of the electromagnetic energy supplied to the antenna. The electromagnetic energy to each antenna element is supplied by a known free running oscillator that is also called a phase locked oscillator. Examples of such free running oscillators are described or referenced in an article by Walter R. Day, entitled "Stablization of Microwave Oscillators by Injection Phase Locking", the Microwave Journal, Mar., 1967, pages 35 through 39. The free running oscillator is characterized by providing a relatively large radio frequency power output that does not have any given frequency. The frequency of the output of the free running oscillator is set by a separate frequency and phase control signal provided by a separate circuit. The power output of the free running oscillator is amplitude modulated or pulsed as desired by a separate modulating input circuit.

The phase control of the free running oscillator is accomplished by a separate circuit that comprises a frequency multiplier and preferably a step recovery diode frequency multiplier. In the multiple antenna array system, there is a step recovery diode frequency multiplier for each free running oscillator. The step recovery diode multiplier is energized by a master oscillator and a master bias control selectively varies and controls the phase of the control signal output of the multiplier. Thus the circuit for controlling the step recovery diode multiplier is separate from the free running oscillator other than the free running oscillator "locks on" to the frequency and phase of the output signal from the multiplier. The high power output capabilities of the free running oscillator are thus utilized, and the step recovery diode multiplier signal to the free running oscillator can be kept relatively low. This allows the step recovery diode multiplier to be used on a linear portion of the response curve of the step recovery diode to provide greater accuracy in phase locking the free running oscillator and also allows the multiplier to be operated in a less demanding mode, which permits the circuit of the step recovery diode multiplier to be simpler than is required where the step recovery diode multiplier provides the electromagnetic power output. Also the circuit of this invention tends to lessen a problem sometimes encountered in using step recovery diode multipliers as an electromagnetic power source. This problem concerns a small phase shift in the output of the step recovery diode multiplier that sometimes occurs when it is necessary to substantially increase the amplitude of the power output of the step recovery diode multiplier. This phase shift, unless compensated for, can result in undesired changes in the shape and direction of the radiated beam.

Therefore it is an object of this invention to provide a new and improved electronically scanning integrated antenna system.

It is another object of this invention to provide a new and improved electronically scanning integrated antenna system having separate means for steering the beam and modulating the beam.

It is another object of this invention to provide a new and improved electronically scanning integrated antenna system that is capable of providing high power radio frequency output with a relatively low power phase control.

It is another object of this invention to provide a new and improved electronically scanning integrated antenna system utilizing a step recovery diode frequency multiplier to frequency and phase control the radio frequency power output but that does not provide the radio frequency power output.

It is another object of this invention to provide a new and improved electronically scanning integrated antenna system wherein a separate oscillator provides radio frequency power to each antenna element.

It is another object of this invention to provide a new and improved electronically scanning integrated antenna system having improved phase linearity and relatively constant power output.

It is another object of this invention to provide a new and improved electronically scanning integrated antenna system having separate oscillators for each antenna element that may be pulse or amplitude modulated simultaneously to modulate the array output and which modulation is independent of the signals applied to step recovery diode multipliers that steer the array.

It will be apparent to those skilled in the art that this invention has many other advantages, applications and novel features that will become more evident in reading the following detailed description and viewing the drawings in which.

Figure 1:
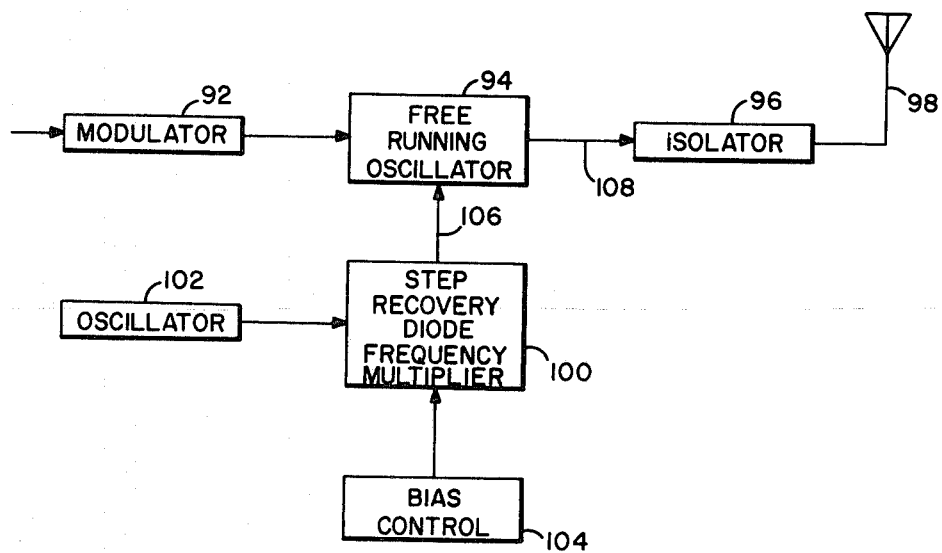
FIG. 1 is a block diagram of the circuit of an antenna element.
Figure 6:
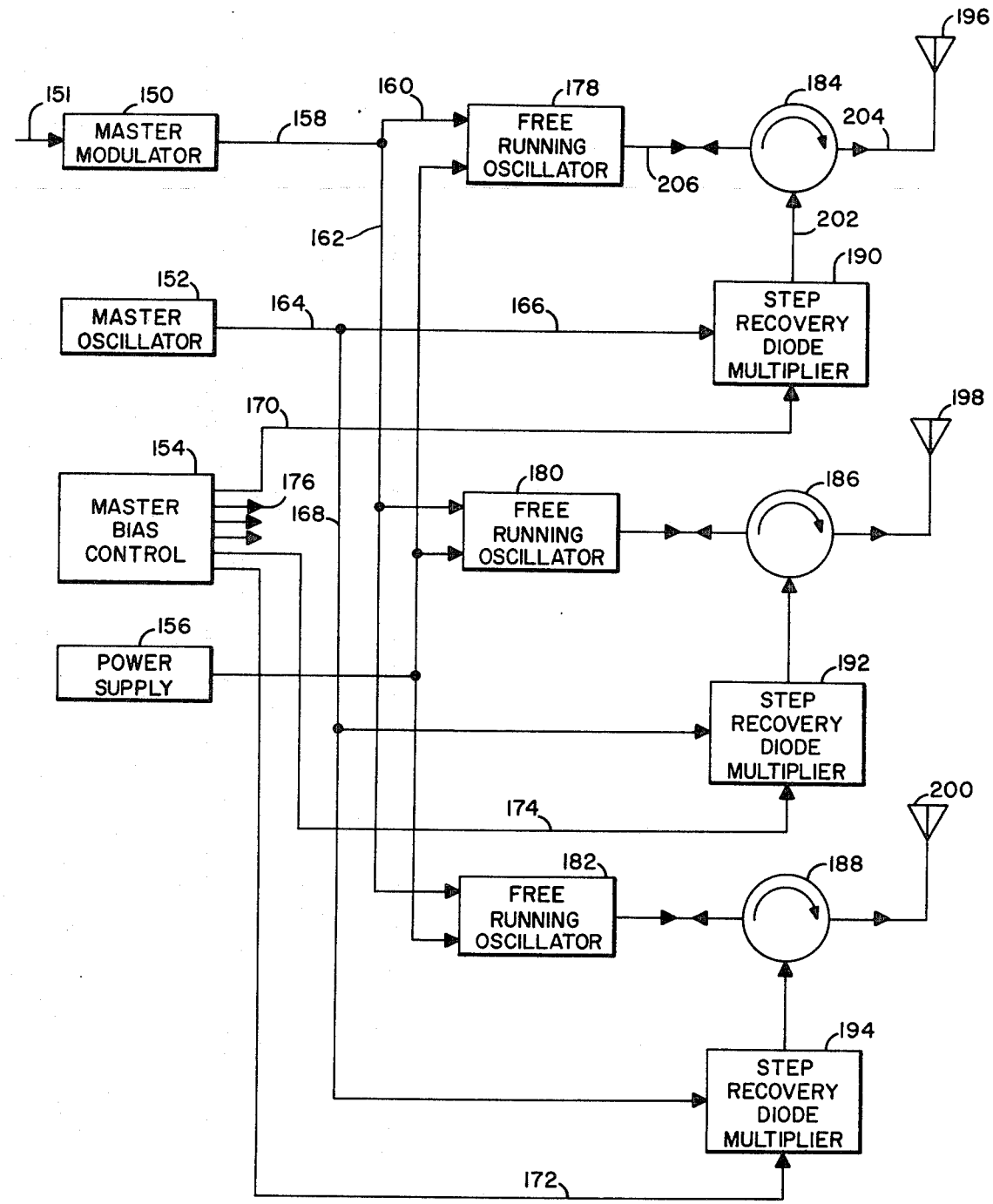
FIG. 6 is a block diagram of the integrated antenna system.

Referring now to FIG. 1, there is illustrated an embodiment of the circuit components in one of the antenna elements of the scannable transmitting antenna array of FIG. 6. A modulator 92 of known design provides an amplitude modulated or pulse modulated signal to a free running oscillator 94. The free running oscillator 94 provides a high power RF signal through the known isolator 96 to the antenna 98. The free running oscillator 94 may comprise a transistor oscillator circuit, an Impatt diode oscillator, a limited space charge accumulation Gunn oscillator or any other high power output, free running oscillator circuit capable of providing an RF signal, such as for example in the X-band range. The free running oscillator 94 is characterized by not having a particular stable, output frequency. Rather the oscillator is phase controlled by a phase locking signal from the step recovery diode frequency multiplier 100. The oscillator 102 provides an alternating signal to step recovery diode and the bias control 104 applies a selected direct current level for phase shifting the signal output of the multiplier 100. The step recovery diode multiplier comprises a very simple and easy to control circuit for providing an accurate and stable frequency signal that is injected into the free running oscillator 94.

There is a step recovery diode multiplier 100 and a free running oscillator 94 for each antenna element of the array illustrated in FIG. 6. The step recovery diode has the capability of multiplying the input frequency from the oscillator 102 and effecting a phase shifting output by means of a simple bias control 104. The process by which a step recovery diode converts power from one frequency to a harmonic of that frequency is well documented in the literature. Reference is made to Steward M. Krakauer, "Harmonic Generation, Rectification, and Lifetime Evaluation With the Step Recovery Diode", Proceedings I.R.E., Volume 50, No. 7, pages 1665–1676, July 1962. The step recovery diode is a diode with special function characteristics and which may also be called a snap diode or a snap varactor.

Basically, the step recovery diode is believed to operate as follows. During forward conduction, a semiconductor diode stores charges in the form of minority carriers in the region of the junction. When the polarity of the voltage applied to the diode is reversed, this stored charge must be swept out before the diode ceases to conduct. Thus the diode is, for a short initial period, able to conduct with relatively low impedance in the reverse direction. When a very abrupt transistion from a reverse storage condition to cutoff occurs, this causes a very rapid drop in the current magnitude flowing through the diode. Accordingly, if the voltage applied to the diode is suddenly reversed, the diode continues to conduct until the charge is depleted. Then the diode suddenly goes from a low to a high impedance. The step recovery diode thus functions as a very high speed switch and is simply a diode whose parameters have been optimized to make the transition from the stored charge condition to the zero current condition take place very rapidly.

When a step recovery diode is used as a frequency multiplier, the step recovery diode is driven alternately into forward and reverse conduction states by the driving voltage. The transition from reverse storage condition to cut off, which occurs each negative half cycle, creates electromagnetic energy output that is rich in higher order harmonics of the driving frequency. These output bursts of the diode can be used to ring a very high Q tank circuit that selects the desired harmonic and supplies the output power between the bursts.

A biasing circuit 104 (or 154 in FIG. 6) is provided for selectively adding positive or negative direct current bias to the input alternating signal and thus selectively positioning the point of current cutoff along the negative half cycle of the input signal. This allows through bias control, in a manner that will be more clearly explained hereinafter, for the exact positioning in time of the point of current cutoff, and thus a means for varying the phase of the output signal relative to the input signal from the oscillator 102. This phase change is multiplied in the frequency multiplication of the step recovery diode and thus the phase change obtained between the phase of the input signal and the output signal can be quite large. Further this large phase change can be obtained with relatively little reduction in the magnitude of the output energy.

The step recovery diode multiplier can be built as a circuit or as a wave guide cavity of either rectangular or circular cross section or it can be built in a coaxial configuration. The multiplier is coupled directly to the free running oscillator as in FIG. 1, through a well known circulator 184 as in FIG. 6, or in any other suitable manner. The step recovery diode multiplier 100 may be coupled directly to the free running oscillator 94 as illustrated in FIG. 1, or be coupled through a well known circulator 184 as illustrated in FIG. 6.

Figure 2:
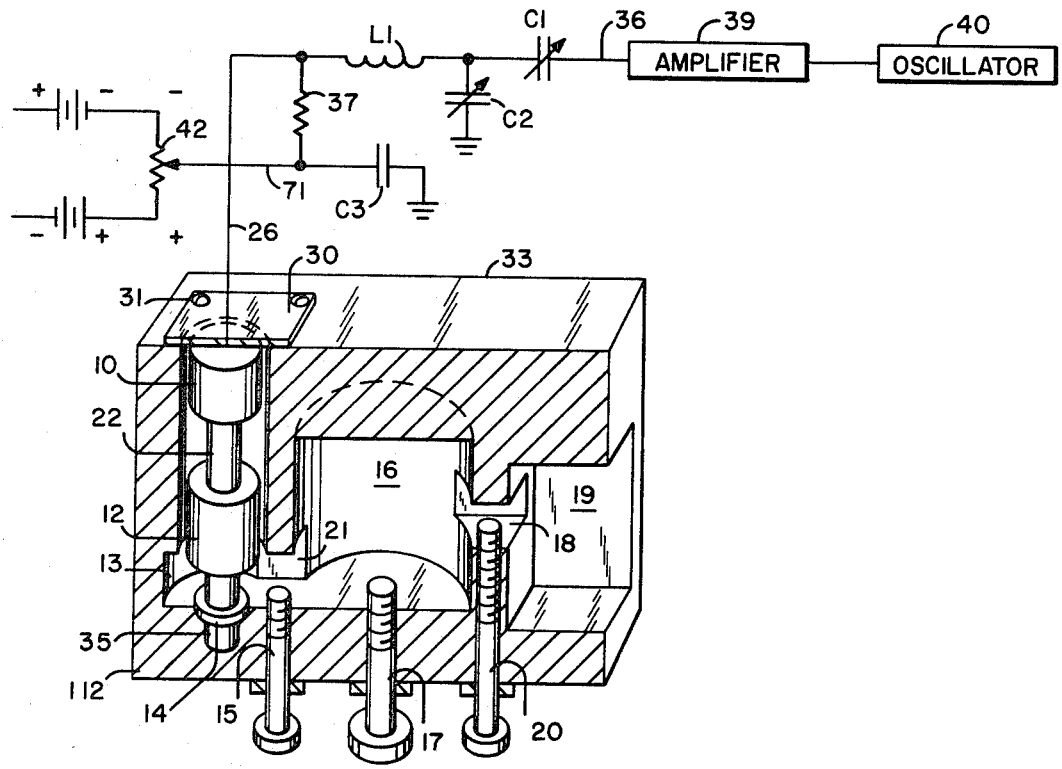
FIG. 2 is a view of a step recovery diode frequency multiplier and phase shifter that is partly in cross section, partly in perspective, partly in schematic and that shows portions of the electrical circuit and wave guide structure.

Referring to FIG. 2, a step recovery diode frequency multiplier (100 in FIG. 1 and 190 in FIG. 6) receives an input signal from the oscillator 40 (oscillator 102 in FIG. 1 and master oscillator 154 in FIG. 6), feeds an alternating signal having frequency of, for example, from 100 to 800 megacycles and a power of from 100 milawatts to 10 watts to the driver amplifier 39. It should be recognized that the input signal is not limited to the above stated frequencies or power requirements. Rather the frequency and power ranges are given merely to be illustrative. The input signal is centered around ground with positive and negative peak voltages. The driver amplifier amplifies the signal and feeds it to line 36. Variable capacitors $C_1$ and $C_2$ and choke $L_1$ in line 36 comprise and LC tank circuit that is tuned and matched to the incoming signal. The total resistances of the impedance matching structure 10, 12, and 22 and the resistance of the step recovery diode 14 constitute a resistance in the tuned tank circuit of capacitors $C_1$ and $C_2$ and choke $L_1$ as illustrated in FIG. 5.

Figure 5:
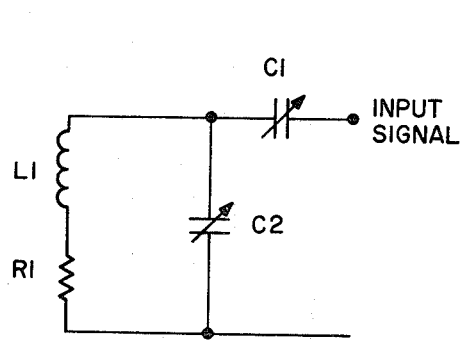
FIG. 5 is a schematic diagram of the equivalent circuit of the frequency multiplier.

The high Q input matching tank circuit, as seen by the input signal, is essentially as shown in FIG. 5. The resistance $R_1$ is the combined resistances of the step recovery diode and the bias resistance. The tank circuit provides good energy storage of the incoming signal and the circuit is easily adjusted and can be made non-microphonic by foaming or potting the components.

A biasing circuit for bias control (104 in FIG. 1) is connected to the input circuit line 36 through isolating resister 37 and by-pass condenser $C_3$. The source of bias comprises positive and negative potential sources connected across a relatively low resistance potentiometer 42. By adjusting the output of potentiometer 42, it is possible to provide bias to line 71 having a selective potential magnitude between zero and positive and negative potentials. The bias resister 37 constitutes a small loss of power since it is shunted by the low impedance of diode 14.

The input line 26 to the step recovery diode 14 includes two metal cylinders 10 and 12 and an intermediate conductor 22, all of which form a diode holder. The cylinders may be made of brass or from other similar and suitable materials and are wrapped with a thin layer of Teflon tape. The cylinders are a quarter wave length in length at the output frequency and are separated by a small diameter section 22 that is also a quarter wave length long.

To the output frequency, the diode holder appears as alternate quarter wave length sections of a high and low impedance coaxial transmission line or effectively as a choke. To the step recovery diode 14, the impedance of the diode holder structure is essentially zero and thus little RF energy at the output frequency escapes from the input line.

The wave guide structure 33 may be made of a conducting metal such as aluminum or the like or the structure can, if desired, be made of a plastic or other suitable material having a conductive metal coating. The holding structure functions to hold the step recovery diode 14 sufficiently rigid to prevent mechanical vibration. A plate 30, that is rigidly fastened to the wave guide structure 33 by screws 31, presses down against cylinder 10 and thus forces the structure and the step recovery diode 14 into a compressed physical structure that rigidly holds the diode 14 into a recess 35 and from physical movement.

Figure 4:
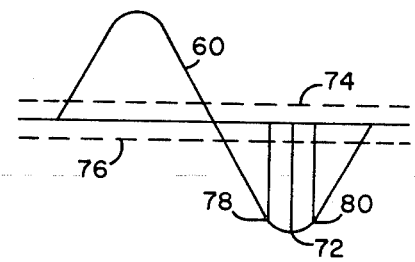
FIG. 4 is a diagrammatic representation of the input signal with bias control to the frequency multiplier.

When the signal is fed through line 26, the signal passes through cylinders 10 and 12 and conductor 22 to the step recovery diode 14. The signal flowing to the step recovery diode 14 has the alternating positive and negative waveform 60 as illustrated in FIG. 4. The diode 14 during the positive half cycle conducts in the forward conducting condition. During the negative half cycle or the reverse conducting condition, the diode opposes reverse current flow, but this condition does not occur instantaneously. Rather there is a delay and this delay permits the step recovery diode to function as a high speed switch. When voltage is applied to the step recovery diode in the forward direction, then a charge, in the form of minority carriers, is stored in the region of the junction. In this condition, the diode 14 has a low impedance in the forward conducting condition. When the voltage applied to the diode is suddenly reversed, then the diode 14 continues to conduct while the stored charge of minority carriers is swept out. When the charge is depleted, the diode suddenly goes from low to high impedance. The step recovery diode thus makes the transition from stored charge conduction to zero current very rapidly. It has been found that this occurs in approximately 100 picoseconds. This sudden interruption of reverse current flow is called the snap action of the step recovery diode.

The particular point of snap of the diode depends upon the total minority carriers stored by a particular step recovery diode and because of variations in step recovery diodes 14, this point usually occurs at a point on the waveform other than at peak negative voltages. Thus the biasing current from the previously described biasing circuit is used to move the snap point to the point of peak negative voltage. As illustrated in FIG. 4, the biasing current 74 and 76 can be positive or negative and have selective magnitudes. The positive biasing current 74 causes the waveform 60 to cross over from positive to negative potential at an earlier point in time. Thus if the normal point of snap of a given diode 14 is at point 80 on waveform 60, then the positive biasing current 74 will move the snap point back to point 72; the desired point of peak negative voltage. Should the snap point of diode 14 occur earlier at point 78, then a negative bias 76 will advance the snap point to point 72. Thus it may be seen that by biasing the input circuit, it is possible to selectively adjust the snap point of step recovery diode 14 to any desired point on the waveform and to selectively vary the time of occurance of the snap action.

The rapid change of current magnitude in the step recovery diode creates electromagnetic wave energy in the wave guide cavity 13 in which it is mounted. Cavity 13 forms a small resonant cavity. While no means for tuning this cavity is provided, the Q of the cavity is comparatively low and therefore it is broad band. Diode 50 represents the step recovery diode 14 of FIG. 2. The diode cavity 13 is coupled to the high Q main cavity 16 through an iris 21. The coupling through iris 21 is adjustable by means of an adjustable capacitive post 15 in the center of the iris. The main resonator or cavity 16 is tunable over a narrow range by a center post 17. Output is taken from the main cavity by a second iris 18 coupled to wave guide 19. The output coupling is adjustable by an iris screw 20 placed in its center.

Figure 3:
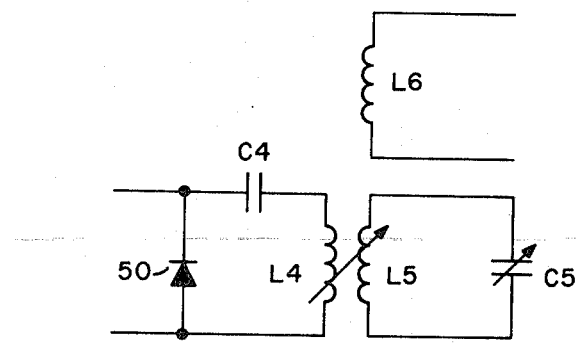
FIG. 3 is a schematic diagram of the equivalent circuit of the multiplier cavity structure illustrated in FIG. 2.

The cavity structures 13, 16, and 19 form a variable frequency output control means that is represented by the equivalent circuit shown in FIG. 3. The cavity 13 is represented in the equivalent circuit as the resonant circuit having capacitor $C_4$ and inductance $L_4$. The resonant circuit of cavity 13 is coupled with the resonant circuit of the cavity 16 that is represented in the equivalent circuit (FIG. 3) by the inductance $L_5$ and capacitance $C_5$. The coupling between these two resonant circuits of cavity 13 and 16 may be varied by post 15. The output wave guide cavity 19 is represented by the inductance $L_6$ and the coupling between cavity 16 and the output wave guide cavity 19 is varied by post 20. Cavity 16 is the resonator or filter for selecting the desired harmonic or frequency output. Adjustment of post 17 tunes the filter to the desired frequency output. Posts 15 and 20 are adjustable to optimize the high Q tank necessary for the step recovery diode output and thus functions to adjust the couplings. The tank circuit acts as the energy storage for the cyclic electromagnetic energy output of the step recovery diode and also acts as a filter or resonator to select the desired harmonic and thus the particular output frequency.

Figure 8:
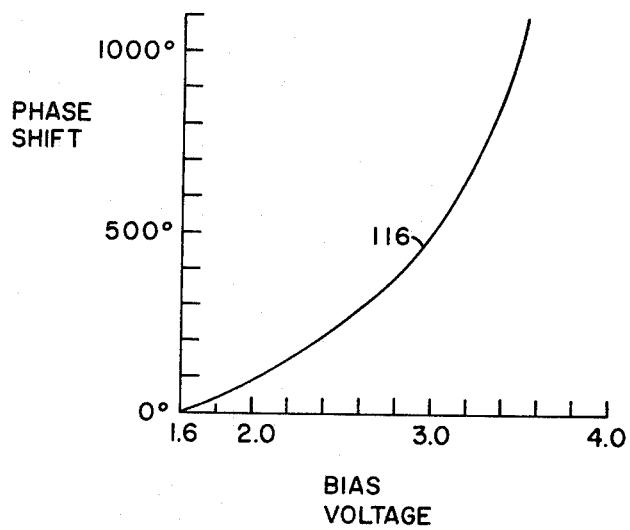
FIG. 8 is a graph illustrating the substantially linear relationship between variation in bias voltage and phase shift in the step recovery diode frequency multiplier.

By adjusting the bias through line 71 to the input tank circuit, it is possible to selectively change the time or phase of the output frequency from the cavity 19 of the wave guide relative to the phase of the signal supplied from the master oscillator. The bias can be effectively used to selectively position the snap point over a range of greater than 45° or 22½° on either side of the peak of the input negative half cycle. This change in time and phase resulting from a change in the time or point of snap of the step recovery diode relative to the time or phase of the input signal; is multiplied in the output frequency. Thus a wide controlled phase change in the output signal is accomplished by varying the direct current bias and thus the snap point of the diode relative to the input signal. The amount of change in phase shift with change in bias has a substantially linear relationship. FIG. 8 shows actual test results obtained that illustrate this fact.

Referring to FIG. 6, there is illustrated an antenna array comprising a plurality of antennas or antenna elements, such as antennas 196, 198, and 200. It should be recognized that any number of antenna elements may be used in the antenna array and generally there would be a sufficient number of antennas to provide an overall matrix array, as is known in the art. Each of the antennas are supplied RF power through a circuit substantially as illustrated in FIG. 1 or in FIG. 6. In the array, a single master modulator 150 provides a modulation signal, that may be amplitude modulated or pulse modulated. The modulated output is fed through line 158 and through lines 160 and 162 to each of the free running oscillators 178, 180, and 182. Each of the free running oscillators provide an RF signal output that without phase and frequency control would have a variable frequency.

A master oscillator 152 provides the alternating positive and negative cycle signal through lines 164 and through lines 166 and 168 to the step recovery diode multipliers 190, 192, and 194. The step recovery diode multipliers, in the manner previously described, provide a given and controllable RF output that is fed through circulators 184, 186, and 188 to the free running oscillators. The circulators 184, 186, and 188 have a known state of the art design and function to provide a signal received through wave guide element 202 and applies this signal through wave guide element 206 to the free running oscillator 178. The free running oscillator 178 then provides an output signal that passes through the same wave guide element 206 through the circulator 184 and through the wave guide element 204 to the radiating antenna 196. The circulator functions as an isolator to protect the step recovery diode multiplier 190 and the free running oscillator 178 from signals that may be radiated back from the antenna elements. Thus the frequency of the free running oscillators is set by the smaller level signal from the step recovery diode multipliers that are injected through the circulators to phase lock the free running oscillators.

Figure 7:
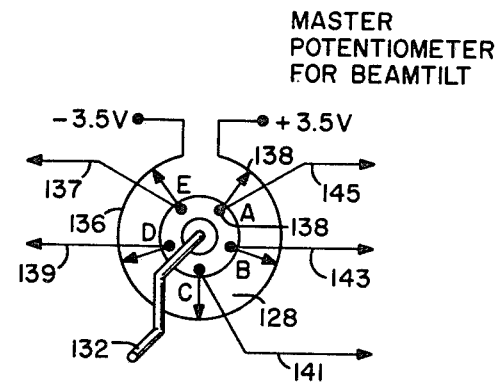
FIG. 7 is an illustration of a representative master bias control.

The master bias control 154 provides a given DC level bias through lines 170, 172, and 174 to the step recovery diode multipliers. The master bias control 154 may be controlled in any suitable manner to selectively program the phase change of the respective step recovery diode multipliers 190, 192, and 194 and other step recovery diode multipliers through lines 176 in other antenna elements in the overall antenna array. For example, the master bias control may comprise a simple master potentiometer 136, as illustrated in FIG. 7. The potentiometer 136 provides selective DC voltage level signals obtained through respective pickoffs A, B, C, D and E and provides DC voltage levels to output lines 137, 139, 141, 143, and 145. This selectively provides a difference in DC levels to the respective step recovery diode multipliers causing the multipliers to change output phase and thus effectively accomplish beam tilt of the beam radiated by the respective antennas.

Since the free running oscillators lock onto the frequency and phase of the output signal of the step recovery diode multipliers, the change in phase of the step recovery diodes effected by the master bias control means 154 changes the phase of the output signals of the respective free running oscillators and thus effectively changes the phase of the output RF power. So, it may be seen that by selectively controlling the bias to the step recovery diode multipliers, the bias control effectively controls the beam tilt of the beam radiated by the antenna array. It should be recognized that the master bias control may be programed by any suitable known programing means for obtaining that pattern of scanning desired. The power supply 156 provides the necessary power to the free running oscillators 178, 180, and 182.

In operation of the antenna array of FIG. 6, the power supply 156 is energized to provide the necessary power to the free running oscillators 178, 180 and 182. The master oscillator 150 is controlled in a manner to simultaneously modulate the beam radiated by each of the antenna elements 196, 198, and 200. A single master oscillator 152 provides the same alternating signal to each of the step recovery diode multipliers so that a single frequency control is applied. The single master bias control 154 separately controls the bias of the step recovery diode multipliers and thus controls the bias of the RF output of the free running oscillators. Thus it may be seen that the modulating circuit and the master bias control are entirely separate circuits making it possible through an efficient utilization of circuitry to provide a free running oscillator for each antenna element in addition to providing separate and distinct phase control of each of the free running oscillators at each of the antenna elements. Thus the power output of the array remains constant as the beam is steered, because variations in the output power of the multipliers as the bias voltages are changed to steer the beam do not effect the output of the individual oscillators 178, 180, and 182.

The power output requirements for the step recovery diode multiplier circuits are not particularly large. Accordingly, the step recovery diode multiplier circuit does not have to be too efficient and can be made to operate in higher order modes. Further the phase of the step recovery diode multiplier may be changed independently of its power output and thus the step recovery diode may be operated on a selected linear portion of its response curve 116 as illustrated in FIG. 8. Further it is also possible, if necessary to provide temperature compensation of the step recovery diode multiplier circuit.

Having disclosed my invention, I now claim.

1. A transmitting antenna element comprising,
   a frequency multiplier for providing an RF signal,
   a free running oscillator means responsive to said RF signal for providing RF power to an antenna, which RF power has the frequency and phase of said RF signal,
   biasing means for selectively varying the phase of said RF signal,
   oscillator means for providing an alternating positive and negative signal,
   said frequency multiplier comprising a step recovery diode means being responsive to said alternating signal,
   said biasing means selectively varies the time of the snap point of said step recovery diode means during the negative half cycle of said alternating signal,
   and modulator means for providing a modulating signal to said free running oscillator.

2. An electronically scanned transmitting antenna array comprising,
   a plurality of antennas,
   a frequency multiplier for each of said antennas for providing an RF signal having a given frequency and phase,
   a free running oscillator for each of said antennas and responsive to said RF signal for providing RF power to a respective antenna, which RF power has the frequency and phase of said RF signal,
   biasing means for selectively varying the phase of the RF output signals from each of said frequency multipliers,
   and a master modulator for providing a modulated signal to said free running oscillators.

* * * * *